Patented Oct. 7, 1947

2,428,437

UNITED STATES PATENT OFFICE 2,428,437

TETRAACETYL RIBONYL CHLORIDE

Max Tishler, Rahway, N. J., assignor to Merck & Co., Inc., Rahway, N. J., a corporation of New Jersey No Drawing. Application July 26, 1945, Serial No. 607,263

1 Claim. (Cl. 260—488)

This invention relates to new chemical compounds and to processes for preparing the same, and is a continuation-in-part of copending application Serial No. 394,505, filed May 21, 1941, which in turn is a continuation-in-part of the then copending application Serial No. 325,182, filed March 21, 1940, now Patent 2,261,608, issued November 4, 1941.

The present invention relates to the synthesis of certain novel acylated ribonyl compounds that are useful as intermediates in the synthesis of the vitamin riboflavin. These novel compounds according to this invention are represented by the general formula:

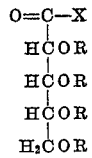

(X is a halogen)

wherein R is an acyl group. In accordance with this invention, these novel compounds are prepared by reactions represented as follows, R again representing an acyl group:

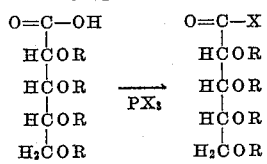

(X is a halogen)

It is now discovered, according to the present invention, that tetraacyl ribonamide may be obtained by acylating ribonamide; tetraacyl ribonic acid may be obtained by treating tetraacyl ribonamide with an oxide of nitrogen; and that tetraacyl ribonyl halide may be obtained by treating a tetraacyl ribonic acid or salt thereof, with a halide or oxyhalide of phosphorus or sulfur.

The latter compound may be reduced to tetraacyl ribose which may then be used in the synthesis of riboflavin.

The following examples illustrate methods of carrying out the present invention, but it is to be understood that these examples are given by way of illustration and not of limitation.

Example 1

Ten grams of tetraacetyl ribonic acid is suspended in 100 cc. of dry benzene, and 15–20 cc. of the benzene is distilled off to remove any residual water. The suspension is allowed to cool to room temperature, and 6.85 g. of $PCl_5$ is added. The reaction mixture is allowed to stand 24 hours with occasional shaking. The small amount of suspended matter is filtered off, and the solution evaporated under reduced pressure to dryness at a bath temperature of 50–60° C. The crude tetraacetyl ribonyl chloride is recrystallized from a mixture of ether-petroleum ether. Yield=6.9 g. (73% theory); M. P. 70–71° C.

Example 2

About 5 grams of tetrapropionyl ribonic acid is dissolved in 10 cc. dry xylene and the mixture heated and stirred under reflux. A mixture of about 0.1 cc. pyridine and about 1.5 cc. thionyl chloride is added and the clear yellow solution refluxed at about 80–5° C. for approximately 2 hours at which time an additional 0.6 cc. thionyl chloride is added and the heating continued for one hour more. The brown solution is shaken with 0.2 g. activated charcoal and filtered, and the solution evaporated to dryness under reduced pressure. The residual product, tetrapropionyl ribonyl chloride is obtained as an oil.

For identification, a portion of the acid chloride is treated in ether with dry ammonia gas. Heat is evolved and a white precipitate appears in a few minutes. Upon filtering and crystallizing this precipitate from absolute alcohol, white plates of tetrapropionyl ribonamide are obtained. (M. P. 123° C.)

Example 3

About 6 grams of tetrabutyryl ribonic acid is dissolved in 10 cc. dry xylene and the mixture heated and stirred under reflux. A mixture of about 0.1 cc. pyridine and about 1.6 cc. thionyl chloride is added and the clear yellow solution refluxed at about 80–85° C. for approximately 2 hours at which time an additional 0.6 cc. of thionyl chloride is added and the heating continued for one hour more. The brown solution is shaken with 0.2 g. activated charcoal and filtered and the solution evaporated to dryness under reduced pressure. The residual product, tetrabutyryl ribonyl chloride, is obtained as oil.

It is identified by dissolving a portion of the acid chloride in ether and treating with dry ammonia gas. The white precipitate, which forms, is filtered and recrystallized from absolute alcohol to produce pure tetrabutyryl ribonamide. (M. P. 93° C.)

Example 4

To about 12 grams of dry tetrapropionyl ribonic acid, suspended in about 100 cc. of dry benzene is added approximately 15 g. of phosphorus pentabromide. The reaction mixture is allowed to stand 24 hours with occasional shaking. The suspended matter is removed by filtration and the solution is evaporated to dryness under reduced pressure at a temperature below 50° C. The residue, crude tetrapropionyl ribonyl bromide, is identified by dissolving a portion thereof in ether and treating with dry ammonia gas. The white precipitate, which forms, is filtered and recrystallized from absolute alcohol to produce pure tetrapropionyl ribonamide. (M. P. 123° C.).

*Example 5*

About 10 grams of tetrabutyryl ribonic acid is dissolved in 20 cc. dry toluene, a mixture of about 0.2 cc. pyridine and about 7.5 g. thionyl bromide is added, and the resulting solution heated at about 80–90° C. for approximately 2 hours; an additional 3.2 grams of thionyl bromide is added and the heating and stirring continued for one hour. The solution is filtered and evaporated to dryness under reduced pressure. The residual product, crude tetrabutyryl ribonyl bromide, is identified by dissolving a portion thereof in ether, and treating with dry ammonia gas. The white precipitate, which forms, is filtered and recrystallized from absolute alcohol to produce pure tetrabutyryl ribonamide (M. P. 92° C.).

Other tetraacylated ribonyl halides may be obtained by employing different tetraacyl ribonic acids, as for example tetrabenzoyl ribonic acid, tetraphenyl acetyl ribonic acid, etc., as starting materials.

Halogenating agents which may be employed in the practice of the presently invented process include the phosphorus halides, as for example, phosphorus pentachloride, prosphorus trichloride, phosphorus pentabromide, phosphorus tribromide, phosphorus triiodide, and the like; thionyl halides, for example, thionyl chloride, thionyl bromide, and the like. Where it is desired to employ other halogenating agents such as phosphorus oxychloride, phosphorus oxybromide, phosphorus oxybromodichloride, sulfuryl chloride, sulfuryl bromide, and the like, the reaction conditions may be varied as will be obvious to those versed in the art. For example if a sulfuryl halide is chosen as the halogenating agent, an alkali metal salt of the tetraacyl ribonic acid should be employed in the reaction.

Modifications may be made in carrying out the present invention without departing from the spirit and scope thereof, and the invention is to be limited only by the appended claims.

What is claimed is:

Tetraacetyl ribonyl chloride.

MAX TISHLER.

REFERENCES CITED

The following references are of record in the file of this patent:

UNITED STATES PATENTS

| Number | Name | Date |
|---|---|---|
| 2,198,628 | Major et al. | Apr. 30, 1940 |
| 2,237,263 | Pasternack et al. | Apr. 1, 1941 |